March 29, 1932.    H. S. YOUNG    1,851,474
RAILWAY SIGNALING TRACK CIRCUITS
Filed May 11, 1931
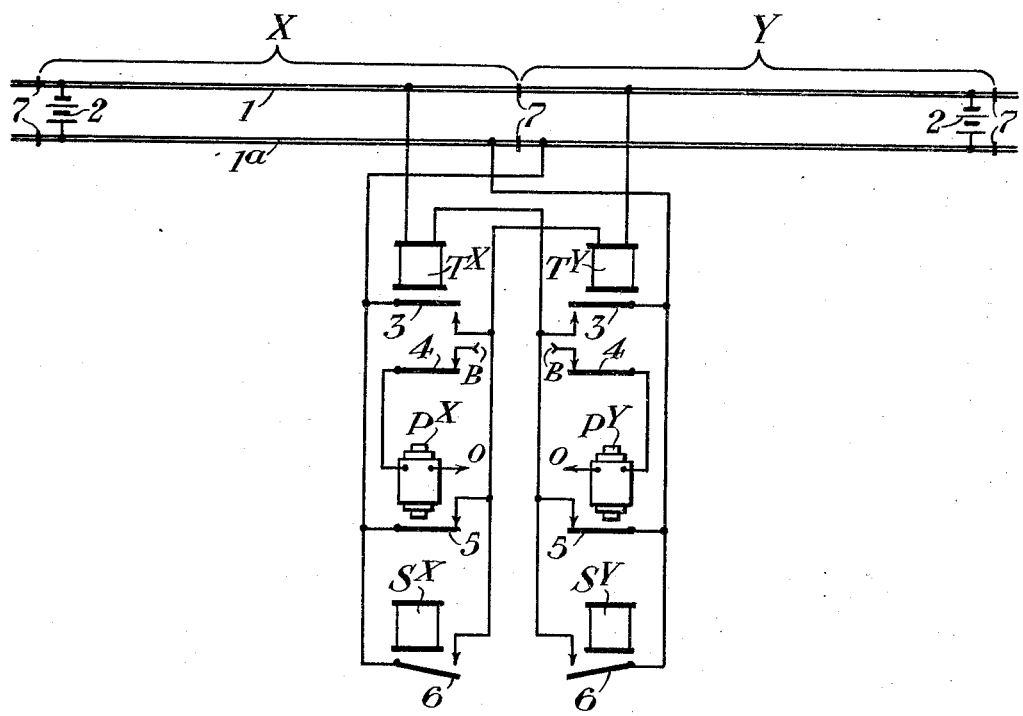
INVENTOR:
H. S. Young,
BY A. R. Vencill
His ATTORNEY.

Patented Mar. 29, 1932

1,851,474

UNITED STATES PATENT OFFICE

HENRY S. YOUNG, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY SIGNALING TRACK CIRCUITS

Application filed May 11, 1931. Serial No. 536,421.

My invention relates to railway signaling track circuits, and has for an object the provision of means operating when a short vehicle passes from one track section to another, to insure that the track relay for the forward section will release before the track relay for the rear section closes.

I will describe one form of track circuit apparatus embodying my invention, and will then point out the novel features thereof in claims.

The accompanying drawing is a diagrammatic view showing one form of apparatus embodying my invention.

Referring to the drawing, the reference characters 1 and $1^a$ designate the rails of a railway track, which rails are divided by insulated joints 7 to form two sections X and Y. Each section is provided with a track battery 2 connected across the rails of the section, and also with a track relay designated by the reference character T with an exponent corresponding to the section. Each section is also provided with a repeater relay P, and a normally deenergized stick relay S.

Track relay $T^x$ is connected across the rails of its section through a front contact 5 of repeater relay $P^y$, and track relay $T^y$ is connected across the rails of its section through the front contact 5 of repeater relay $P^x$. The circuit for track relay $T^x$ is provided with a branch around contact 5 of relay $P^y$, which branch includes a back contact 3 of relay $T^y$; and the circuit for relay $T^x$ is provided with a second branch around contact 5 of relay $P^y$, which second branch includes a front contact 6 of relay $S^y$. Similarly, the circuit for track relay $T^y$ is provided with two branches around contact 5 of relay $P^x$, one of which branches includes back contact 3 of track relay $T^x$, and the other of which branches includes front contact 6 of relay $S^x$.

Relay $P^x$ is provided with a circuit which includes front contact 4 of relay $T^x$, the terminals of the source of current for this circuit being represented by the reference characters B and O. It follows that relay $P^x$ will be energized or deenergized according as the front contact 4 of relay $T^x$ is closed or open. Relay $P^y$ is controlled in a similar manner by front contact 4 of relay $T^y$.

The stick relays S are the usual directional stick relays of an absolute permissive block signaling system, and inasmuch as the controlling circuits for these relays form no part of the present invention, these circuits are omitted from the drawing in order to simplify the disclosure. It is sufficient to say that when a train moving toward the left passes along the portion of track shown in the drawing, relay $S^y$ will remain open, but relay $S^x$ will become energized when the vehicle enters section X and will remain energized at least until the vehicle leaves this section. Similarly, when a train moves toward the right, relay $S^x$ will remain open, but relay $S^y$ will become energized when the vehicle enters section Y and will remain energized at least until the vehicle leaves this section.

Normally both track relays $T^x$ and $T^y$ are energized. When a train moving toward the left enters section Y, it will place relay $T^y$ on short circuit, so that this relay will open, thereby closing its back contact 3. After a brief interval of time following the release of relay $T^y$, relay $P^y$ will also open. The circuit for relay $T^x$ will then be completed through back contact 3 of relay $T^y$, but will be opened at contacts 5 and 6 of relays $P^y$ and $S^y$, respectively. When the forward wheels and axles of the vehicle enter section X, they will place relay $T^x$ on short circuit, thereby deenergizing the relay, but a short interval of time will elapse before the relay will release, because, as is well understood, when the coils of a direct current relay are deenergized and placed on short circuit, the relay automatically becomes slow-releasing in character. It follows that unless preventive means are provided, relay $T^x$ may remain closed until after the rear wheels of the vehicle have left section Y and have allowed relay $T^y$ to close. Assuming now that relay $T^x$ remains closed until the rear wheels leave section Y, the instant that relay $T^y$ starts to close, its back contact 3 will open, and this will open the circuit for relay $T^x$, so that the latter relay will immediately release. It follows that there can be no instant of time during which relays $T^x$ and $T^y$ are both closed while a vehicle is passing from section Y into section X. The opening of relay $T^x$ will cause relay $S^x$ to close, so that the circuit for relay $T^y$ will then be closed at back contact 3 of relay $T^x$ and from contact 6 of relay $S^x$. When the vehicle passes out of section X, track relay $T^x$ will pick up, but this will not interfere with the track circuit for section Y, because contact 6 of relay $S^x$ will still be closed. After relay $P^x$ picks up in response to the closing of relay $T^x$, relay $S^x$ will release and the apparatus will be restored to its normal condition.

The operation of the apparatus during the passage of a vehicle from left to right will be understood from the foregoing without detailed explanation.

If traffic moves in only one direction, the apparatus can be considerably simplified. Assuming, for example, that traffic moves only from right to left, track relay $T^y$ may be connected directly across the rails of section Y, and track relay $T^x$ may be connected across the rails of section X through contact 3 of relay $T^y$ and contact 5 of relay $P^y$ in multiple. The apparatus will then function in the same manner as before, in that when a vehicle passes from section Y to section X, the circuit for relay $T^x$ will be immediately opened if relay $T^y$ becomes energized before relay $T^x$ releases.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, two adjoining sections of railway track, a source of track circuit current for each section, a track relay for each section connected across the rails of its section through a back contact of the other track relay, a slow-releasing repeater relay for each section controlled by a front contact of the associated track relay, a normally open stick relay for each section arranged to become closed when a vehicle passes from the other section into the associated section but not when a vehicle moves in the other direction, and a branch around each of said track relay back contacts including in multiple a front contact of the associated repeater relay and a front contact of the associated stick relay.

2. In combination, a rear and a forward section of railway track, a track circuit including a track relay for the rear section, a slow-releasing relay for the rear section controlled by a front contact of said track relay, a track relay for the forward section connected across the rails through a front contact of said repeater relay, and a shunt around said repeater relay front contact including a back contact of the track relay for the rear section.

3. In combination, two adjoining sections of railway track, a track circuit including a track relay for each section, and means controlled by one of said relays and operating when it becomes energized due to a vehicle passing from the associated section into the other section to momentarily disconnect the track relay for such other section from at least one rail of its section.

In testimony whereof I affix my signature.

HENRY S. YOUNG.